US012700160B2

(12) United States Patent
Chen et al.

(10) Patent No.: US 12,700,160 B2
(45) Date of Patent: Aug. 4, 2026

(54) SCALED SPATIOTEMPORAL TRANSFORMERS FOR TEXT-TO-VIDEO SYNTHESIS

(71) Applicant: Snap Inc., Santa Monica, CA (US)

(72) Inventors: Tsai-Shien Chen, Merced, CA (US); Yuwei Fang, Redmond, WA (US); Anil Kag, Los Angeles, CA (US); Willi Menapace, Santa Monica, CA (US); Jian Ren, Hermosa Beach, CA (US); Aliaksandr Siarohin, Los Angeles, CA (US); Ivan Skorokhodov, Los Angeles, CA (US); Sergey Tulyakov, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 246 days.

(21) Appl. No.: 18/428,545

(22) Filed: Jan. 31, 2024

(65) Prior Publication Data

US 2025/0245897 A1 Jul. 31, 2025

(51) Int. Cl.
*G06T 13/20* (2011.01)

(52) U.S. Cl.
CPC .................................... *G06T 13/20* (2013.01)

(58) Field of Classification Search
None
See application file for complete search history.

(56) References Cited

PUBLICATIONS

Podell et al.; "SDXL: Improving Latent Diffusion Models for High-Resolution Image Synthesis;" Jul. 4, 2023; arXiv preprint arXiv: 2307.01952; pp. 1-21 (Year: 2023).*
NPL 50. Jascha Sohl-Dickstein, Eric Weiss, Niru Maheswaranathan, and Surya Ganguli. Deep Unsupervised Learning Using Nonequilibrium Thermodynamics. In International Conference on Machine Learning (ICML), 2015.
NPL 51. Yang Song and Stefano Ermon. Generative Modeling by Estimating Gradients of the Data Distribution. In Advances in Neural Information Processing Systems (NeurIPS), 2019.
NPL 52. Yang Song and Stefano Ermon. Improved Techniques for Training Score-Based Generative Models. In Advances in Neural Information Processing Systems (NeurIPS), 2020.
NPL 53. Yang Song, Conor Durkan, Iain Murray, and Stefano Ermon. Maximum Likelihood Training of Score-Based Diffusion Models, 2021.
NPL 54. Yang Song, Jascha Sohl-Dickstein, Diederik P Kingma, Ab-hishek Kumar, Stefano Ermon, and Ben Poole. Score-Based Generative Modeling through Stochastic Differential Equations. In International Conference on Learning Representations (ICLR), 2021.

(Continued)

*Primary Examiner* — Peter Hoang
(74) *Attorney, Agent, or Firm* — CM Law; Stephen J. Weed

(57) ABSTRACT

A text-to-video framework including a far-reaching interleaved transformer (FIT) block configured to learn a compressed representation of video input using a set of learnable latent tokens. The FIT block includes a diffusion framework and joint spatiotemporal modeling. The FIT block performs patchification of the video input to produce a sequence of patch tokens that are divided into groups. The FIT block instantiates the set of latent tokens and applies a sequence of computational blocks, and projects the patch tokens to generate video frames.

20 Claims, 8 Drawing Sheets

(56) References Cited

PUBLICATIONS

NPL 55. Khurram Soomro, Amir Roshan Zamir, and Mubarak Shah. UCF101: A Dataset of 101 Human Actions Classes from Videos in the Wild. arXiv, 2012.

NPL 56. Nitish Srivastava, Elman Mansimov, and Ruslan Salakhudinov. Unsupervised Learning of Video Representations Using LSTMs. In International Conference on Machine Learning (ICML), 2015.

NPL 57. Jiayan Teng, Wendi Zheng, Ming Ding, Wenyi Hong, Jian-qiao Wangni, Zhuoyi Yang, and Jie Tang. Relay diffusion: Unifying Diffusion Process Across Resolutions for Image Synthesis. arXiv, 2023.

NPL 58. Yu Tian, Jian Ren, Menglei Chai, Kyle Olszewski, Xi Peng, Dimitris N Metaxas, and Sergey Tulyakov. A Good Image Generator is What You Need for High-Resolution Video Synthesis. In International Conference on Learning Representations (ICLR), 2021.

NPL 59. Sergey Tulyakov, Ming-Yu Liu, Xiaodong Yang, and Jan Kautz. MoCoGAN: Decomposing Motion and Content for Video Generation. In Proceedings of the IEEE Conference on Computer Vision and Pattern Recognition (CVPR), 2018.

NPL 60. Thomas Unterthiner, Sjoerd van Steenkiste, Karol Kurach, Raphael Marinier, Marcin Michalski, and Sylvain Gelly. Towards Accurate Generative Models of Video: A New Metric & Challenges. arXiv, 2018.

NPL 61. Ruben Villegas, Mohammad Babaeizadeh, Pieter-Jan Kindermans, Hernan Moraldo, Han Zhang, Mohammad Taghi Saffar, Santiago Castro, Julius Kunze, and D. Erhan. Phenaki: Variable Length Video Generation from Open Domain Textual Description. In International Conference on Learning Representations (ICLR), 2023.

NPL 62. Wenjing Wang, Huan Yang, Zixi Tuo, Huiguo He, Junchen Zhu, Jianlong Fu, and Jiaying Liu. Videofactory: Swap Attention in Spatiotemporal Diffusions for Text-to-Video Generation. arXiv, 2023.

NPL 63. Chenfei Wu, Lun Huang, Qianxi Zhang, Binyang Li, Lei Ji, Fan Yang, Guillermo Sapiro, and Nan Duan. GODIVA: Generating Open-Domain Videos from Natural Descriptions. ArXiv, 2021.

NPL 64. Chenfei Wu, Jian Liang, Lei Ji, Fan Yang, Yuejian Fang, Daxin Jiang, and Nan Duan. NUWA: Visual Synthesis Pre-training for Neural Visual World Creation. In Proceedings of the European Conference of Computer Vision (ECCV), 2022.

NPL 65. Jun Xu, Tao Mei, Ting Yao, and Yong Rui. MSR-VTT: A large Video Description Dataset for Bridging Video and Language. Proceedings of the IEEE Conference on Computer Vision and Pattern Recognition (CVPR), 2016.

NPL 66. Wilson Yan, Yunzhi Zhang, Pieter Abbeel, and Aravind Srinivas. VideoGPT: Video Generation using VQ-VAE and Transformers. arXiv, 2021.

NPL 67. Sheng-Siang Yin, Chenfei Wu, Huan Yang, Jianfeng Wang, Xiaodong Wang, Minheng Ni, Zhengyuan Yang, Linjie Li, Shuguang Liu, Fan Yang, Jianlong Fu, Gong Ming, Lijuan Wang, Zicheng Liu, Houqiang Li, and Nan Duan. NUWA-XL: Diffusion Over Diffusion for Extremely Long Video Generation. In Annual Meeting of the Association for Computational Linguistics, 2023.

NPL 68. Yang You, Jing Li, Sashank Reddi, Jonathan Hseu, Sanjiv Kumar, Srinadh Bhojanapalli, Xiaodan Song, James Dem-mel, Kurt Keutzer, and Cho-Jui Hsieh. Large Batch Optimization for Deep Learning: Training BERT in 76 Minutes. In International Conference on Learning Representations (ICLR), 2020.

NPL 69. Jiahui Yu, Yuanzhong Xu, Jing Yu Koh, Thang Luong, Gunjan Baid, Zirui Wang, Vijay Vasudevan, Alexander Ku, Yinfei Yang, Burcu Karagol Ayan, Ben Hutchinson, Wei Han, Zarana Parekh, Xin Li, Han Zhang, Jason Baldridge, and Yonghui Wu. Scaling Autoregressive Models for Content-Rich Text-to-Image Generation. Transactions on Machine Learning Research, 2022.

NPL 70. Lijun Yu, Yong Cheng, Kihyuk Sohn, Jose' Lezama, Han Zhang, Huiwen Chang, Alexander G. Hauptmann, Ming-Hsuan Yang, Yuan Hao, Irfan Essa, and Lu Jiang. MAGVIT: Masked Generative Video Transformer. In Proceedings of the IEEE Conference on Computer Vision and Pattern Recognition (CVPR), 2023.

NPL 71. Sihyun Yu, Jihoon Tack, Sangwoo Mo, Hyunsu Kim, Junho Kim, Jung-Woo Ha, and Jinwoo Shin. Generating Videos with Dynamics-Aware Implicit Generative Adversarial Networks. In International Conference on Learning Representations (ICLR), 2022.

NPL 72. Daquan Zhou, Weimin Wang, Hanshu Yan, Weiwei Lv, Yizhe Zhu, and Jiashi Feng. Magic Video: Efficient Video Generation with Latent Diffusion Models. arXiv, 2023.

NPL 73. Willi Menapace, Aliaksandr Siarohin, Ivan Skorokhodov, Ekaterina Deyneka, Tsai-Shien Chen, Anil Kag, Yuwei Fang, Aleksei Stoliar, Elisa Ricci, Jian Ren, Sergey Tulyakov, Snap Inc., University of Trento, UC Merced, Fondazione Bruno Kessler, Snap Video: Scaled Spatiotemporal Transformers for Text-to-Video Synthesis, arXiv:2402.14797v1 [cs.CV], Feb. 22, 2024.

International Search Report and Written Opinion for International Application No. PCT/US2025/012940, dated May 13, 2025 (May 13, 2025)—8 pages.

NPL 01. Pika lab discord server. https://www.pika.art/. Accessed: Nov. 1, 2023.

NPL 02. Jie An, Songyang Zhang, Harry Yang, Sonal Gupta, Jia-Bin Huang, Jiebo Luo, and Xi Yin. Latent-shift: Latent Diffusion with Temporal Shift for Efficient Text-to-Video Generation. arXiv, 2023.

NPL 03. Yogesh Balaji, Seungjun Nah, Xun Huang, Arash Vahdat, Jiaming Song, Qinsheng Zhang, Karsten Kreis, Miika Aittala, Timo Aila, Samuli Laine, Bryan Catanzaro, Tero Karras, and Ming-Yu Liu. eDiff-I: Text-to-Image Diffusion Models with an Ensemble of Expert Denoisers. ArXiv, 2022.

NPL 04. Andreas Blattmann, Robin Rombach, Huan Ling, Tim Dockhorn, Seung Wook Kim, Sanja Fidler, and Karsten Kreis. Align your Latents: High-Resolution Video Synthesis with Latent Diffusion Models. In Proceedings of the IEEE Conference on Computer Vision and Pattern Recognition (CVPR), 2023.

NPL 05. Tim Brooks, Janne Hellsten, Miika Aittala, Ting-Chun Wang, Timo Aila, Jaakko Lehtinen, Ming-Yu Liu, Alexei A. Efros, and Tero Karras. Generating Long Videos of Dynamic Scenes. In Advances in Neural Information Processing Systems (NeurIPS), 2022.

NPL 06. Tim Brooks, Aleksander Holynski, and Alexei A. Efros. InstructPix2Pix: Learning to Follow Image Editing Instructions. In Proceedings of the IEEE Conference on Computer Vision and Pattern Recognition (CVPR), 2023.

NPL 07. Ting Chen. On the Importance of Noise Scheduling for Diffusion Models. arXiv, 2023.

NPL 08. Ting Chen and Lala Li. Fit: Far-reaching Interleaved Transformers. arXiv, 2023.

NPL 09. Aidan Clark, Jeff Donahue, and Karen Simonyan. Efficient Video Generation on Complex Datasets. arXiv, 2019.

NPL 10. Prafulla Dhariwal and Alexander Quinn Nichol. Diffusion Models Beat GANs on Image Synthesis. In Advances in Neu-ral Information Processing Systems (NeurIPS), 2021.

NPL 11. Patrick Esser, Johnathan Chiu, Parmida Atighehchian, Jonathan Granskog, and Anastasis Germanidis. Structure and Content-Guided Video Synthesis with Diffusion Models. In Proceedings of the IEEE Conference on Computer Vision and Pattern Recognition (CVPR), 2023.

NPL 12. Songwei Ge, Thomas Hayes, Harry Yang, Xi Yin, Guan Pang, David Jacobs, Jia-Bin Huang, and Devi Parikh . Long Video Generation with Time-Agnostic VQGAN and Time-Sensitive transformer. In Proceedings of the European Conference of Computer Vision (ECCV), 2022.

NPL 13. Songwei Ge, Seungjun Nah, Guilin Liu, Tyler Poon, Andrew Tao, Bryan Catanzaro, David Jacobs, Jia-Bin Huang, Ming-Yu Liu, and Yogesh Balaji. Preserve Your Own Correlation: A Noise Prior for Video Diffusion Models. In Proceedings of the IEEE International Conference on Computer Vision (ICCV), 2023.

NPL 14. Jiatao Gu, Shuangfei Zhai, Yizhe Zhang, Miguel Angel Bautista, and Josh Susskind. f-DM: A Multi-Stage Diffusion Model Via Progressive Signal Transformation. International Conference on Learning Representations (ICLR), 2023.

NPL 15. Jiatao Gu, Shuangfei Zhai, Yizhe Zhang, Josh Susskind, and Navdeep Jaitly. Matryoshka Diffusion Models. arXiv, 2023.

(56) References Cited

PUBLICATIONS

NPL 16. Yuwei Guo, Ceyuan Yang, Anyi Rao, Yaohui Wang, Yu Qiao, Dahua Lin, and Bo Dai. Animatediff: Animate Your Personalized Text-to-Image Diffusion Models Without Specific Tuning. arXiv, 2023.
NPL 17. Yingqing He, Tianyu Yang, Yong Zhang, Ying Shan, and Qifeng Chen. Latent Video Diffusion Models for High-Fidelity Long Video Generation. arXiv, 2023.
NPL 18. Martin Heusel, Hubert Ramsauer, Thomas Unterthiner, Bernhard Nessler, and Sepp Hochreiter. GANS Trained by a Two Time-Scale Update Rule Converge to a Local Nash Equilibrium. In Advances in Neural Information Processing Systems (NeurIPS), 2017.
NPL 19. Jonathan Ho and Tim Salimans. Classifier-Free Diffusion Guidance. arXiv, 2022.
NPL 20. Jonathan Ho, Ajay Jain, and Pieter Abbeel. Denoising Diffusion Probabilistic Models. In Advances in Neural Information Processing Systems (NeurIPS), 2020.
NPL 21. Jonathan Ho, William Chan, Chitwan Saharia, Jay Whang, Ruiqi Gao, Alexey Gritsenko, Diederik P. Kingma, Ben Poole, Mohammad Norouzi, David J. Fleet, and Tim Salimans. Imagen video: High Definition Video Generation with Diffusion Models. arXiv, 2022.
NPL 22. Jonathan Ho, Tim Salimans, Alexey A. Gritsenko, William Chan, Mohammad Norouzi, and David J. Fleet. Video Diffusion Models. In ICLR Workshop on Deep Generative Models for Highly Structured Data, 2022.
NPL 23. Wenyi Hong, Ming Ding, Wendi Zheng, Xinghan Liu, and Jie Tang. CogVideo: Large-Scale Pretraining for Text-to-Video Generation Via Transformers. arXiv, 2022.
NPL 24. Emiel Hoogeboom, Jonathan Heek, and Tim Salimans. Simple Diffusion: End-to-End Diffusion for High Resolution Images. In Proceedings of the 40th International Conference on Machine Learning (ICML), 2023.
NPL 25. Tero Karras, Miika Aittala, Timo Aila, and Samuli Laine. Elucidating the Design Space of Diffusion-Based Generative Models. In Advances in Neural Information Processing Systems (NeurIPS), 2022.
NPL 26. Diederik P. Kingma and Jimmy Ba. Adam: A Method for Stochastic Optimization. arXiv, 2015.
NPL 27. Tuomas Kynk"a" anniemi, Tero Karras, Miika Aittala, Timo Aila, and Jaakko Lehtinen. The Role of Imagenet Classes in Frechet Inception Distance. In International Conference on Learning Representations (ICLR), 2023.
NPL 28. Alex X. Lee, Richard Zhang, Frederik Ebert, P. Abbeel, Chelsea Finn, and S. Levine. Stochastic Adversarial Video Prediction. arXiv, abs/1804.01523, 2018.
NPL 29. Yitong Li, Martin Min, Dinghan Shen, David Carlson, and Lawrence Carin. Video Generation from Text. Proceedings of the AAAI Conference on Artificial Intelligence (AAAI), 2018.
NPL 30. Yanyu Li, Huan Wang, Qing Jin, Ju Hu, Pavlo Chemerys, Yun Fu, Yanzhi Wang, Sergey Tulyakov, and Jian Ren. Snap-fusion: Text-to-Image Diffusion Model on Mobile Devices Within Two Seconds. arXiv, 2023.
NPL 31. Yaofang Liu, Xiaodong Cun, Xuebo Liu, Xintao Wang, Yong Zhang, Haoxin Chen, Yang Liu, Tieyong Zeng, Raymond Chan, and Ying Shan. Evalcrafter: Benchmarking and Evaluating Large Video Generation Models. arXiv, 2023.
NPL 32. Z. Luo, D. Chen, Y. Zhang, Y. Huang, L. Wang, Y. Shen, D. Zhao, J. Zhou, and T. Tan. Videofusion: Decomposed Diffusion Models for High-Quality Video Generation. In Proceedings of the IEEE Conference on Computer Vision and Pattern Recognition (CVPR), 2023.
NPL 33. Siwei Ma, Xinfeng Zhang, Chuanmin Jia, Zhenghui Zhao, Shiqi Wang, and Shanshe Wang. Image and Video Compression with Neural Networks: A review. IEEE Transactions on Circuits and Systems for Video Technology, 2019.
NPL 34. Gaurav Mittal, Tanya Marwah, and Vineeth N. Balasubramanian. Sync-DRAW: Automatic Video Generation using Deep Recurrent Attentive Architectures. In Proceedings of the 25th ACM International Conference on Multimedia, 2017.
NPL 35. Guillaume Le Moing, Jean Ponce, and Cordelia Schmid. CCVS: Context-aware Controllable Video Synthesis. In Advances in Neural Information Processing Systems (NeurIPS), 2021.
NPL 36. Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Kopf, Edward Yang, Zach DeVito, Martin Raison, Alykhan Tejani, Sasank Chilamkurthy, Benoit Steiner, Lu Fang, Junjie Bai, and Soumith Chintala. PyTorch: An Imperative Style, High-Performance Deep Learning Library. 2019.
NPL 37. Chenyang Qi, Xiaodong Cun, Yong Zhang, Chenyang Lei, Xintao Wang, Ying Shan, and Qifeng Chen. FateZero: Fusing Attentions for Zero-shot Text-based Video Editing. In Proceedings of the IEEE International Conference on Computer Vision (ICCV), 2023.
NPL 38. Alec Radford, Jong Wook Kim, Chris Hallacy, Aditya Ramesh, Gabriel Goh, Sandhini Agarwal, Girish Sastry, Amanda Askell, Pamela Mishkin, Jack Clark, Gretchen Krueger, and Ilya Sutskever. Learning Transferable Visual Models from Natural Language Supervision. In International Conference on Machine Learning (ICML), 2021.
NPL 39. Colin Raffel, Noam Shazeer, Adam Roberts, Katherine Lee, Sharan Narang, Michael Matena, Yanqi Zhou, Wei Li, and Peter J. Liu. Exploring the Limits of Transfer Learning With a Unified Text-to-Text Transformer. Journal of Machine Learning Research (JMLR), 2022.
NPL 40. Robin Rombach, Andreas Blattmann, Dominik Lorenz, Patrick Esser, and Bjorn Ommer. High-Resolution Image Synthesis with Latent Diffusion Models. arXiv, 2021.
NPL 41. Olaf Ronneberger, Philipp Fischer, and Thomas Brox. U-Net: Convolutional Networks for Biomedical Image Segmentation. In Medical Image Computing and Computer-Assisted Intervention (MICCAI), 2015.
NPL 42. Nataniel Ruiz, Yuanzhen Li, Varun Jampani, Yael Pritch, Michael Rubinstein, and Kfir Aberman. DreamBooth: Fine Tuning Text-to-Image Diffusion Models for Subject-Driven Generation. In Proceedings of the IEEE Conference on Computer Vision and Pattern Recognition (CVPR), 2023.
NPL 43. Chitwan Saharia, William Chan, Saurabh Saxena, Lala Li, Jay Whang, Emily L. Denton, Seyed Kamyar Seyed Ghasemipour, Burcu Karagol Ayan, Seyedeh Sara Mah-davi, Raphael Gontijo Lopes, Tim Salimans, Jonathan Ho, David J. Fleet, and Mohammad Norouzi. Photorealistic Text-to-Image Diffusion Models with Deep Language Understanding. arXiv, 2022.
NPL 44. Masaki Saito, Shunta Saito, Masanori Koyama, and Sosuke Kobayashi. Train Sparsely, Generate Densely: Memory-Efficient Unsupervised Training of High-resolution Temporal GAN, 2020.
NPL 45. Tim Salimans and Jonathan Ho. Progressive Distillation for Fast Sampling of Diffusion Models. In International Conference on Learning Representations (ICLR), 2022.
NPL 46. Tim Salimans, Ian Goodfellow, Wojciech Zaremba, Vicki Cheung, Alec Radford, and Xi Chen. Improved Techniques for Training GANs. In Advances in Neural Information Processing Systems (NeurIPS), 2016.
NPL 47. Xiaoqian Shen, Xiang Li, and Mohamed Elhoseiny. MoStGAN-V: Video Generation with Temporal Motion Styles. In Proceedings of the IEEE Conference on Computer Vision and Pattern Recognition (CVPR), 2023.
NPL 48. Uriel Singer, Adam Polyak, Thomas Hayes, Xi Yin, Jie An, Songyang Zhang, Qiyuan Hu, Harry Yang, Oron Ashual, Oran Gafni, Devi Parikh, Sonal Gupta, and Yaniv Taigman. Make-a-Video: Text-to-Video Generation Without Text-Video Data. arXiv, 2022.
NPL 49. Ivan Skorokhodov, Sergey Tulyakov, and Mohamed Elhoseiny. StyleGAN-V: A Continuous Video Generator with the Price, Image Quality and Perks of StyleGAN2. In Proceedings of the IEEE Conference on Computer Vision and Pattern Recognition (CVPR), 2022.

* cited by examiner

Joint Spatiotemporal Model

FIG. 3A

Separable Spatiotemporal Model

SCALED SPATIOTEMPORAL TRANSFORMERS FOR TEXT-TO-VIDEO SYNTHESIS

TECHNICAL FIELD

The present subject matter relates to text-to-video synthesis.

BACKGROUND

Text-to-video models may be used to generate videos from text input. Current large-scale diffusion-based video generation frameworks are strongly rooted into their image generation framework counterparts. Such an approach is suboptimal due to image and video modalities having intrinsic differences due to the similarity of content in successive video frames.

BRIEF DESCRIPTION OF THE DRAWINGS

The drawing figures depict one or more implementations, by way of example only, not by way of limitations. In the figures, like reference numerals refer to the same or similar elements. When a plurality of similar elements is present, a single reference numeral may be assigned to like elements, with an added letter referring to a specific element. Included in the drawing are the following figures:

FIG. 3A is a block diagram illustrating a model of a U-Net convolutional neural network;

FIG. 3B is a block diagram illustrating a joint spatiotemporal model of a far-reaching interleaved transformer (FIT) model;

DETAILED DESCRIPTION

Figure 1:
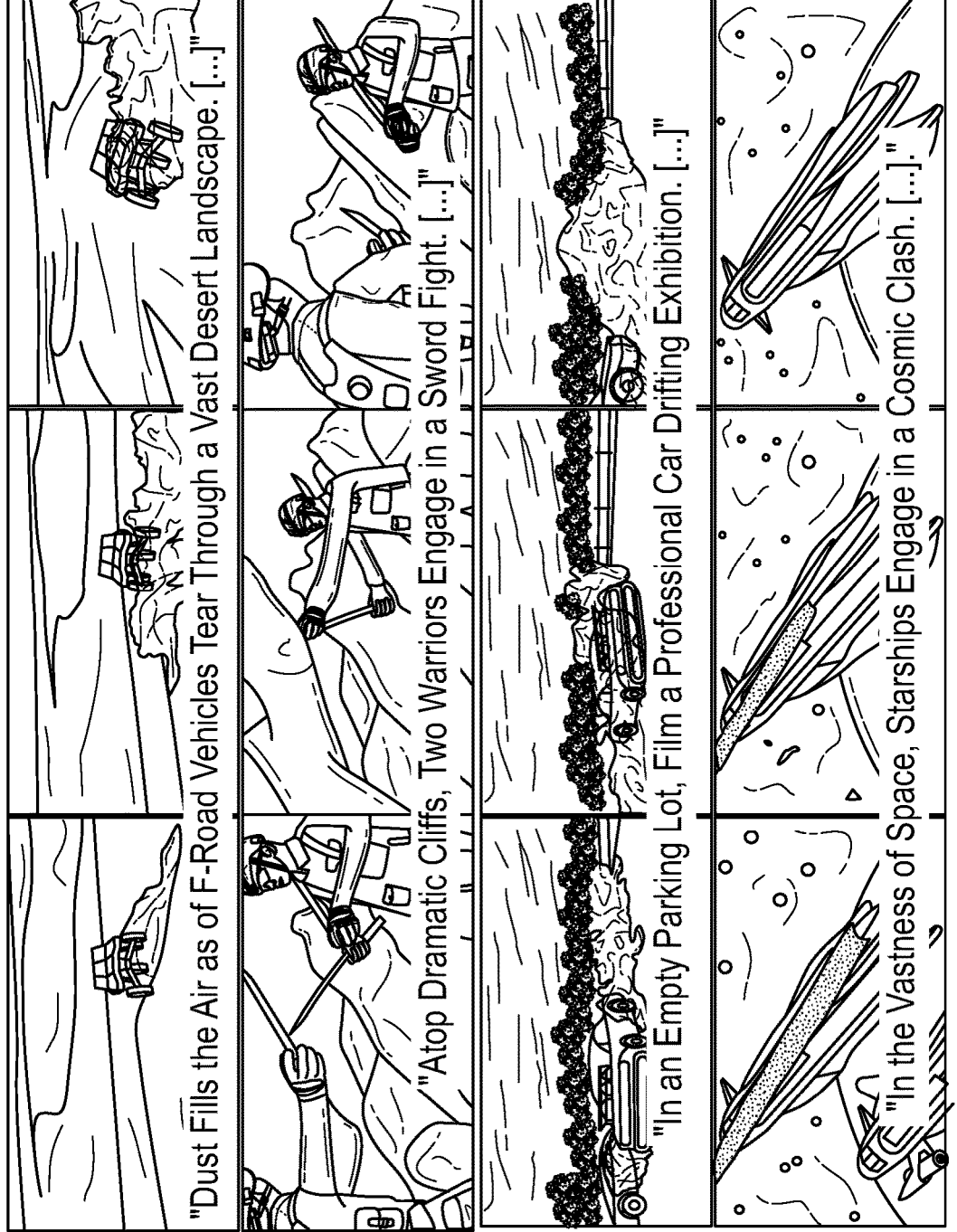
FIG. 1 is a series of illustrations depicting video samples produced by a text-to-video generation method for a selection of text prompts.
Figure 1:
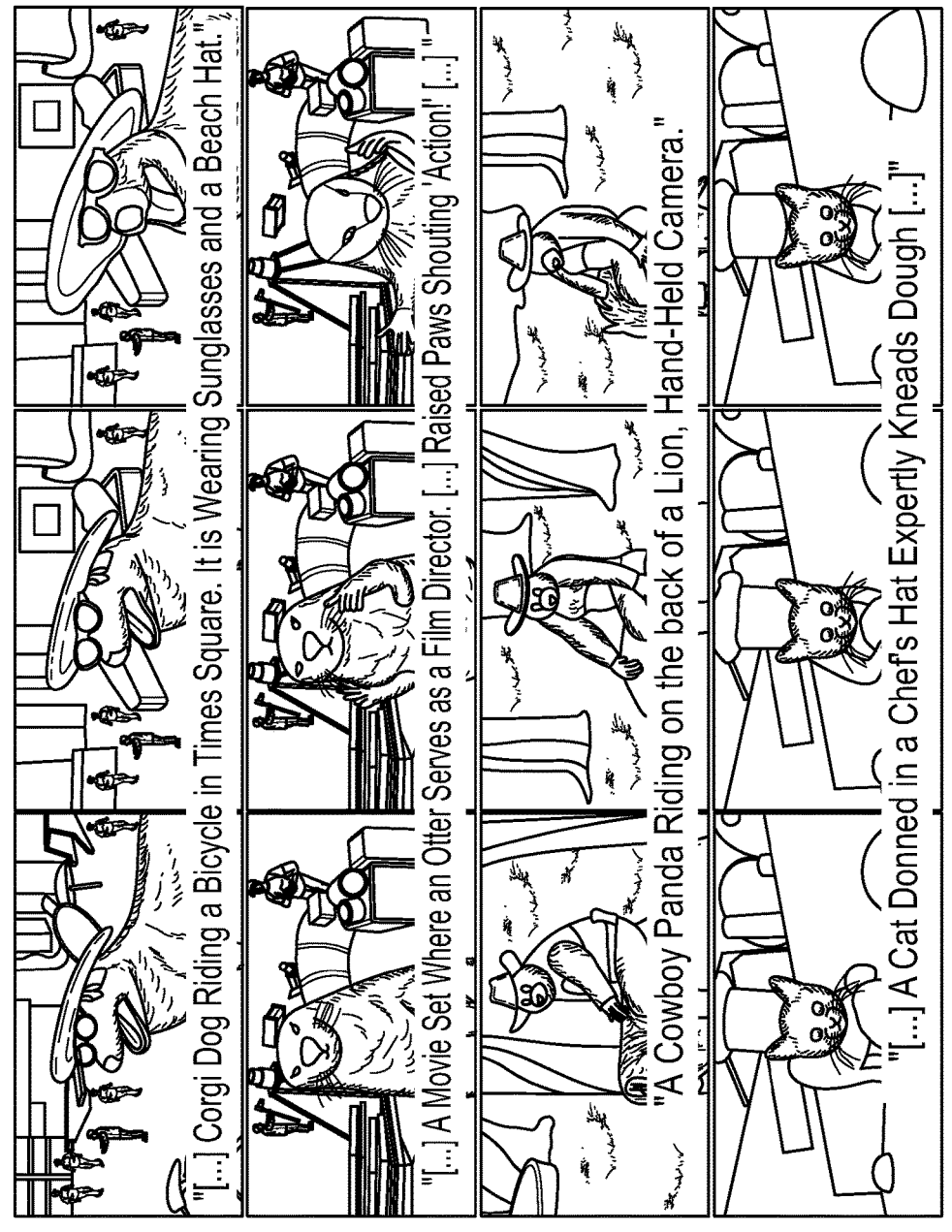

This disclosure is directed to a text-to-video framework including a far-reaching interleaved transformer (FIT) block configured to learn a compressed representation of the video input using a set of learnable latent tokens. The FIT block includes a diffusion framework and joint spatiotemporal modeling. The FIT block performs patchification of the video input to produce a sequence of patch tokens that are divided into groups. The FIT block instantiates the set of latent tokens and applies a sequence of computational blocks, and projects the patch tokens to generate video frames.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples to provide a thorough understanding of the relevant teachings. However, it should be apparent to those skilled in the art that the present teachings may be practiced without such details. In other instances, well known methods, procedures, components, and circuitry have been described at a relatively high-level, without detail, to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

Reference now is made in detail to the examples illustrated in the accompanying drawings and discussed below.

Creating and sharing visual content is one way for people to express themselves in the digital world. Accessible to only professionals in the past, the capability to create images with stunning quality and realism was unlocked to everyone by the advent of large text-to-image models and their variations.

Fueled by this progress, large-scale text-to-video models are rapidly advancing too. Current large-scale diffusion-based video generation frameworks are strongly rooted into their image counterparts. The availability of consolidated image generation architectures such as U-Net convolutional neural networks with publicly-available image-pretrained models made them a logical foundation onto which to build large-scale video generators with the main architectural modifications focusing on the insertion of ad-hoc layers to capture temporal dependencies. Similarly, training is performed under image-based diffusion frameworks with the model being applied both to videos and to a separate set of images to improve the diversity of the results.

Such an approach is suboptimal under multiple aspects. First, image and video modalities present intrinsic differences given by the similarity of content in successive video frames. By analogy, image and video compression algorithms are based on vastly different approaches. Second, the widely adopted U-Net architecture is required to fully process each video frame. This increases computational overhead compared to purely text-to-image models, posing a very practical limit on model scalability. The latter is a critical factor in obtaining high-quality of results. Extending U-Net-based architectures to naturally support spatial and temporal dimensions requires volumetric attention operations, which have prohibitive computational demands. Inability to do so affects the outputs, resulting in dynamic images or motion artifacts being generated instead of videos with coherent and diverse actions.

This disclosure leverages repetition between video frames and provides a scalable transformer architecture that treats spatial and temporal dimensions as a single, compressed, 1-dimensional (1D) latent vector. This highly compressed representation enables performing spatio-temporal computation jointly and enables modelling of complex motions. The architecture is scaled to contain billions of parameters for the first time. Compared to U-Nets, an example model disclosed herein features a significant 3.31× reduction in training time and 4.49× reduction in inference time while achieving higher generation quality.

This disclosure uses a two-stage cascaded model out of two considerations: (i) it avoids temporal inconsistencies in the forms of flickering of high-frequency details that may be introduced by latent autoencoders (ii) it increases model capacity with respect to an end-to-end model by creating two specialized models, one for the low resolution focusing on motion modeling and scene structure, and one for the high-resolution, focusing on high-frequency details. High-resolution videos are created by rewriting the EDM diffusion framework for high-dimensional inputs and using an efficient transformer architecture based on FITs which are scaled to billions of parameters and tens of thousands input patches.

Diffusion models have achieved success in image and video generation. Among the proposed frameworks, Miika Aittala, Timo Aila, and Samuli Laine provided a unified view of common diffusion frameworks and formulate in their paper Elucidating the design space of diffusion-based generative models (published in Advances in Neural Information Processing Systems (NeurIPS), 2022; referred to herein as EDM. EDM defines a variance-exploding forward diffusion process $p(x_\sigma|x) \sim \mathcal{N}(x, \sigma^2 I)$, where $\sigma \in [\sigma_{min}, \sigma_{max}]$ represents the diffusion timestep coinciding with the standard deviation of the applied noise, and $x_\sigma$ represents the data at the current noise level. A denoiser function $\mathcal{D}_\theta$ is learned to model the reverse process using the denoising objective shown in Equation (1):

$$\mathcal{L}(\mathcal{D}_\theta) = \mathbb{E}_{\sigma,x,\epsilon}\left[\lambda(\sigma)\|\mathcal{D}_\theta(x_\sigma) - x\|_2^2\right], \tag{1}$$

where $\lambda$ is the loss weighting function, $x \sim p_{data}$ is a sample from the data distribution, $\epsilon$ is gaussian noise, and $\sigma \sim p_{train}$ is sampled from a training distribution.

$\mathcal{D}_\theta(x_\sigma)$ is defined as shown in Equation (2):

$$\mathcal{D}_\theta(x_\sigma) = c_{out}(\sigma)\mathcal{F}_\theta(c_{in}(\sigma)x_\sigma) + c_{skip}(\sigma)x_\sigma, \tag{2}$$

where $\mathcal{F}_\theta$ is a neural network, and $c_{out}$, $c_{skip}$ and $c_{in}$ represent scaling functions.

In particular, the denoising objective $\mathcal{L}(\mathcal{F}_\theta)$ can equivalently be expressed in terms of $\mathcal{F}_\theta$ as shown in Equation (3):

$$\mathcal{L}(\mathcal{F}_\theta) = \mathbb{E}_{\sigma,x,\epsilon}\left[w(\sigma)\|\mathcal{F}_\theta(c_{in}(\sigma)x_\sigma) - c_{nrm}(\sigma)\mathcal{F}_{tgt}\|_2^2\right], \tag{3}$$

where $\mathcal{F}_{tgt}$ represents the training target, $c_{nrm}$ is a normalization factor, and w is a weighting function. These forms are presented in Table 1. A second order Runge-Kutta sampler reverses the diffusion process and produces sample x starting from gaussian noise $x_{\sigma_{max}} \sim \mathcal{N}(0, \sigma_{max}^2 I)$.

TABLE 1

| | EDM | FIT |
|---|---|---|
| Training and Losses | | |
| Forw. process $\quad x_\sigma$ | $x/\sigma_{in} + \sigma\epsilon$ | $x/\sigma_{in} + \sigma\epsilon$ |
| Training target $\quad \mathcal{F}_{tgt}$ | $\sigma x - \sigma_{data}^2\epsilon + \dfrac{\sigma_{data}^2(\sigma_{in} - 1)}{\sigma_{in}\sigma}$ | $x - \sigma x + \sigma_{data}^2\epsilon$ |
| Eff. loss weigh. $\quad w(\sigma)$ | $1$ | $\left(\sigma^2 + \sigma_{data}^2\right)^2 / \left(\sigma^2 + \dfrac{\sigma_{data}^2}{\sigma_{in}}\right)^2$ |
| Loss weigh. $\quad \lambda(\sigma)$ | $1/\sigma_{data}^2 + 1/\sigma^2$ | $1/\sigma_{data}^2 + 1/\sigma^2$ |
| Network Parametrization | | |
| Input scaling $\quad c_{in}(\sigma)$ | $1/\sqrt{\sigma_{data}^2 + \sigma^2}$ | $1/\sqrt{\sigma_{data}^2/\sigma_{in}^2 + \sigma^2}$ |
| Output scaling $\quad c_{out}(\sigma)$ | $\dfrac{\sigma\sigma_{data}^2}{\sqrt{\sigma^2 + \sigma_{data}^2}}$ | $-\sigma_{in}\sigma\sigma_{data}\dfrac{\sqrt{\sigma^2 + \sigma_{data}^2}}{\sigma_{data}^2 + \sigma_{in}\sigma^2}$ |
| Skip scaling $\quad c_{skip}(\sigma)$ | $\dfrac{\sigma_{data}^2}{\sigma^2 + \sigma_{data}^2}$ | $\dfrac{\sigma_{in}\sigma_{data}^2}{\sigma_{in}\sigma^2 + \sigma_{data}^2}$ |
| Target scaling $\quad c_{arm}(\sigma)$ | $1/\sigma_{data}\sqrt{\sigma^2 + \sigma_{data}^2}$ | $1/\sigma_{data}\sqrt{\sigma^2 + \sigma_{data}^2}$ |

Table 1 shows definitions of functions in Equation (1), Equation (2), and Equation (3) for the EDM and for the disclosed diffusion framework, where the terms induced in this disclosure by the input scaling factor $\sigma_{in}$ are shown. The disclosed framework is equivalent to EDM for $\sigma_{in}=1$ but avoids the unstable $$\frac{\sigma_{data}^2(\sigma_{in} - 1)}{\sigma_{in}\sigma}$$

term introduced by $\sigma_{in} \neq 1$ in $\mathcal{F}_{tgt}$. This form highlights that the train target and loss weight match the v-prediction framework for $\sigma_{data}=1$. In this example, all other framework parameters are unaltered with respect to EDM.

EDM was originally proposed as an image generation framework and its parameters are optimized for 64×64px image generation. Alterations in spatial resolution or the introduction of videos with shared content between image frames allow the denoising network to trivially recover a noisy frame in the original resolution with higher signal-tonoise-ratio (SNR), which the original framework was designed to see at lower noise levels. To understand why, consider a noisy video $x_\sigma \in \mathbb{R}^{T \times S \cdot H \times S \cdot W} \sim \mathcal{N}(x, \sigma^2 I)$ where T is the number of frames and s is an upsampling factor. This disclosure provides the corresponding clean and noisy frames at original resolution $\tilde{x}, \tilde{x}_\sigma \in \mathbb{R}^{1 \times H \times W}$ by averaging values in each $T \times s \times s$ block of pixels. As a consequence of averaging, the noise variance is reduced by a factor $Ts^2$, $$\tilde{x}_\sigma \sim \mathcal{N}\left(\tilde{x}, \frac{\sigma^2}{Ts^2} I\right),$$

thus $\tilde{x}_\sigma$ has an increased signal-to-noise-ratio with respect to $x_\sigma$: $SNR_{\tilde{x}_\sigma} = Ts^2 SNR_{x_\sigma}$. If pixels in each block share similar content, a typical situation in high-resolution videos, then the information in the averaged frame is useful for recovering x and can be exploited at training time by the denoiser function. This creates a train-inference mismatch during the initial sampling steps as the average frame does not yet contain a well-formed signal, yet the denoiser is reliant on its presence. Thus, in this example, for improved performance, any alteration to T or s should instead maintain the same signal-to-noise ratio at the original resolution for which the diffusion framework was designed.

Figure 2:
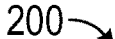
FIG. 2 are illustrations depicting a diffusion process restoring the optimal signal-to-noise ratio (SNR) at the original resolution by reducing a magnitude of the input signal.
Figure 2:
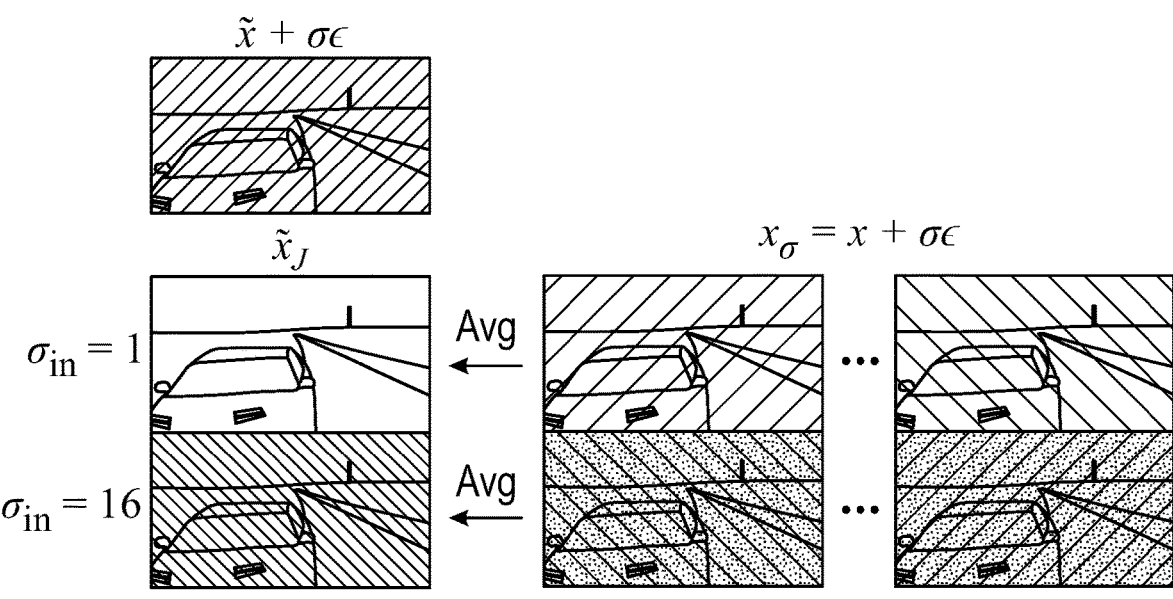

To restore the optimal SNR at the original resolution, the magnitude of the input signal may be reduced by a corresponding factor $\sigma_{in} = S\sqrt{T}$ as shown in the equations and images 200 of FIG. 2. Consequently, the forward process is redefined as $p(x_\sigma | x) \sim \mathcal{N}(x/\sigma_{in}, \sigma^2 I)$. The EDM framework is rewritten in this disclosure to introduce an input scaling factor in a new framework where changes to the EDM framework are shown in Table 1. It is noted that a naive introduction of the scaling factor would alter the training target $\mathcal{F}_{tgt}$ in a way that makes the objective explode for small noise values. Thus, the training objective expressed in the form of Equation (3) is leveraged to rewrite the EDM process in a way that ensures $\mathcal{F}_{tgt}$ remains unchanged, the effective loss weight $w(\sigma)$ is such that it keeps the loss weight $\lambda(\sigma)$ unchanged, $c_{in}(\sigma)$ and $c_{nrm}(\sigma)$ normalize the input and training target to have unit variance, and the framework is equivalent to the original EDM formulation for $\sigma_{in}=1$.

The sampler is modified according to the newly defined forward process that requires the signal component in $x_\sigma$ to be scaled by $\sigma_{in}$. This is achieved by dividing the $\mathcal{D}_\theta(x_\sigma)$ by $\sigma_{in}$ and multiplying the final denoised sample $x_0$ by $\sigma_{in}$ to restore the signal magnitude.

Due to the limited amount of captioned video data with respect to images, joint image-video training is widely adopted with the same diffusion process typically applied to both modalities. However, the presence of T frames in videos calls for a different process with respect to an image with the same resolution. A possibility is to adopt different input scaling factors for the two modalities. However, this possible solution is undesirable in that it increases complexity of the framework and image training would not foster the denoising model to learn temporal reasoning, a desirable capability of a video generator. To sidestep these issues while using a unified diffusion process, the image and video modalities are matched by treating images as T frame videos with infinite frame-rate and providing a variable frame-rate training procedure blending the gap between the image and video modalities.

Figures 3A, 3B:
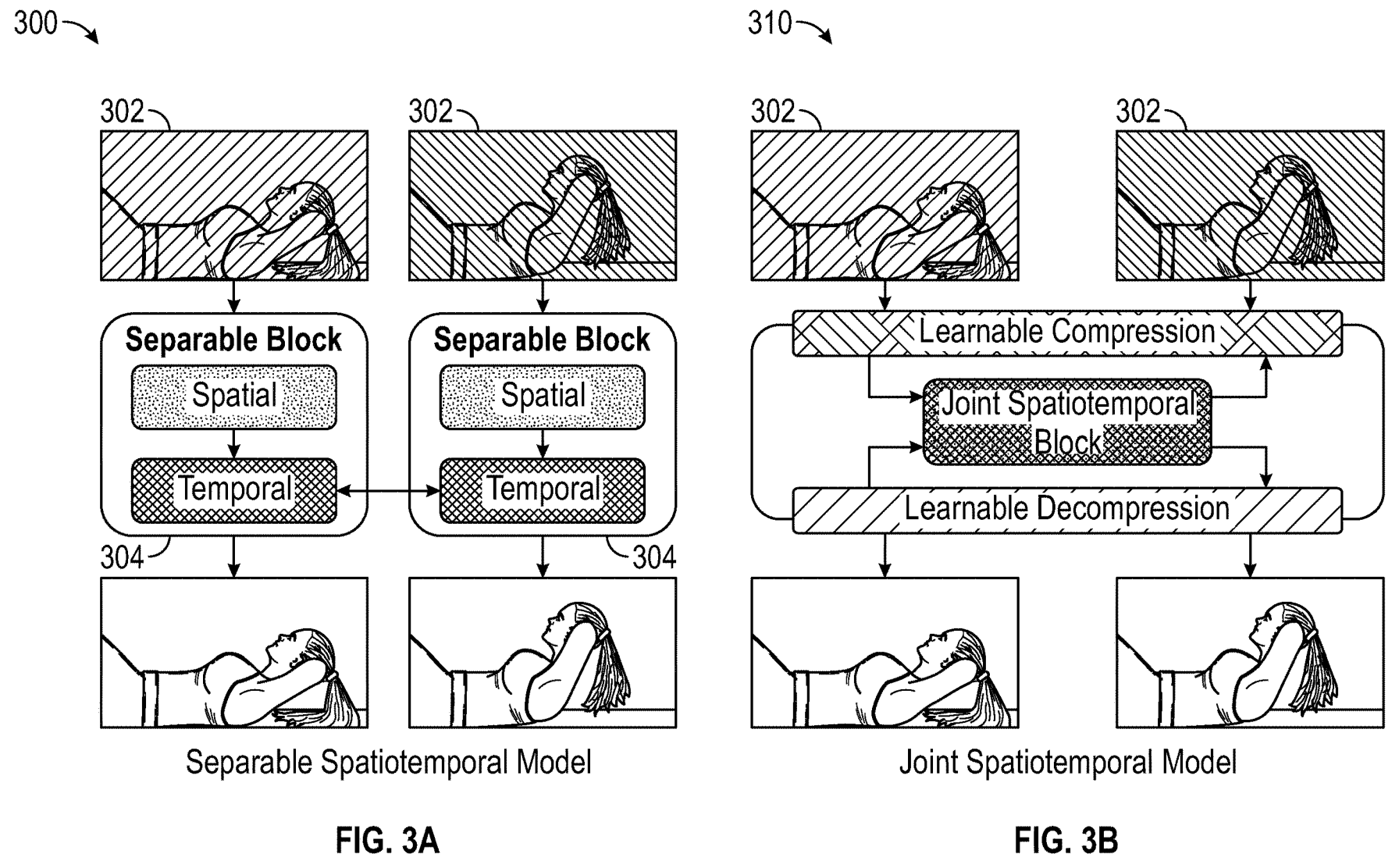

U-Nets have shown success in video generation where they are typically augmented with temporal attention or convolutions for modeling the temporal dimension. A model 300 of a U-Net is shown in FIG. 3A. However, this approach requires a full U-Net forward pass for each of the T video frames of videos 302, rapidly becoming prohibitively expensive. These factors pose a practical limit on model scalability, a primary factor in achieving high generation quality and similarly limit possibilities for joint spatio-temporal modeling. Treating spatial and temporal modeling in separable blocks 304 causes motion artifacts, temporal inconsistencies or generation of dynamic images rather than videos with vivid motion. Video frames, however, contain spatially and temporally redundant content that is amenable to compression.

Far-reaching Interleaved Transformers (FITs) are efficient transformer-based architectures that have recently been proposed for high-resolution image synthesis and video generation.

While promising, these U-Net and FITs architectures have not yet been scaled to the billion-parameters size of state-of-the-art U-Net-based video generators, nor have they been applied to high-resolution video generation.

According to examples in this disclosure, learning and operating on a compressed video representation and jointly modeling the spatial and temporal dimensions achieves the scalability and motion-modeling capabilities needed for high-quality video generation. A joint spatiotemporal model is shown at 310 in FIG. 3B. FIG. 1 shows video samples 100 produced by the text-to-video generation method for a selection of text prompts. Based on the joint spatiotemporal video model 310, a video generator synthesizes temporally coherent videos with large motion (first page of FIG. 1) while retaining the semantic control capabilities typical of large-scale text-to-video generators (second page of FIG. 1).

Figure 3C:
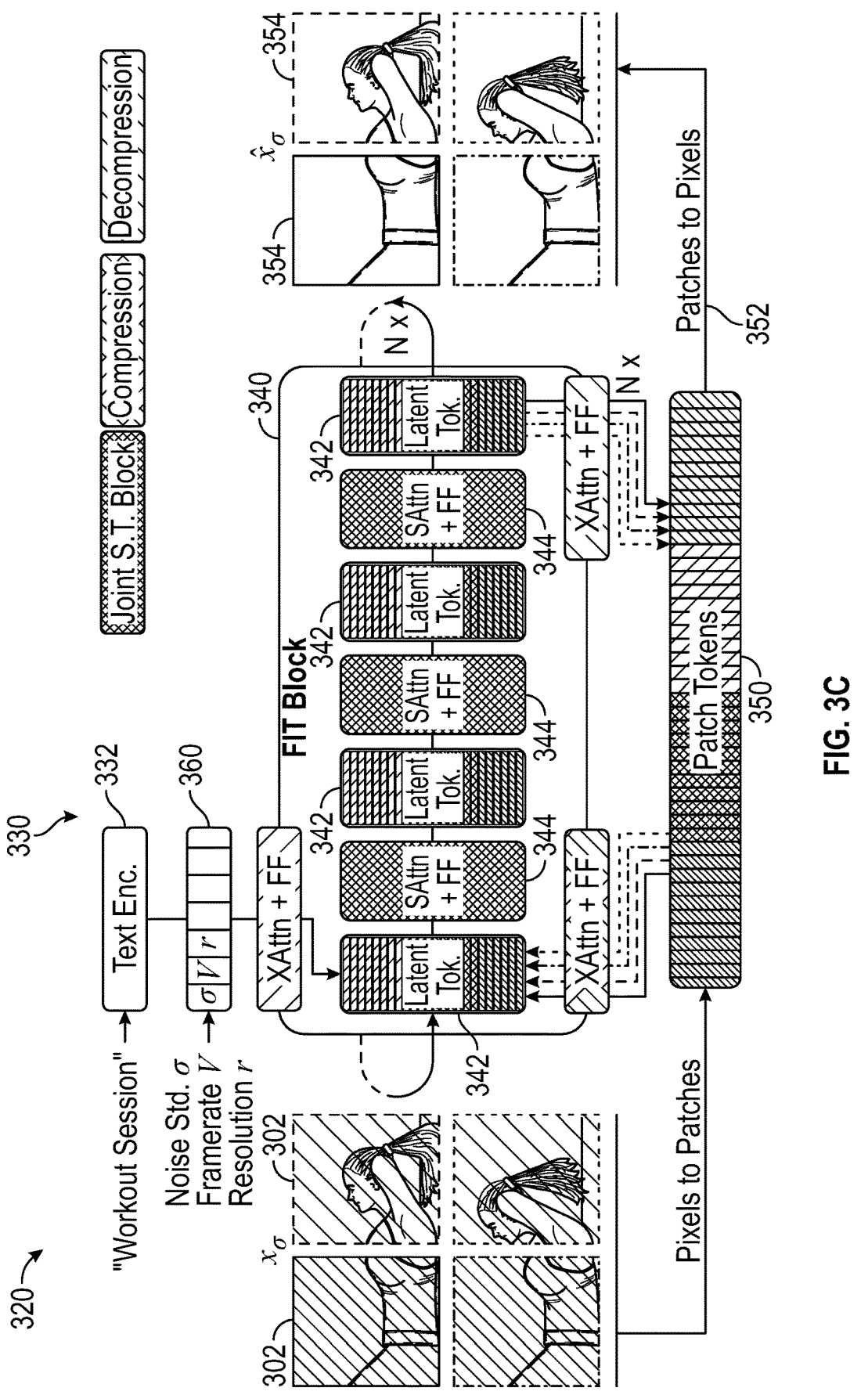
FIG. 3C is a block diagram illustrating an architecture of the FIT model of FIG. 3B.

An architecture of an improved FIT 320 of the joint spatiotemporal model 310 is shown in FIG. 3C, where the FIT 320 is a scalable video generator. A method 330 of operating FIT 320 shows learning a compressed representation of a video input 332 through a set of learnable latent tokens 342 and focusing computation on this learnable latent space, allowing input dimensionality to grow with little performance penalty. First, a FIT block 340 performs patchification of the text provided to video input 332 to produce a sequence of patch tokens 350 which are later divided into groups. The set of latent tokens 342 is then instantiated and a sequence of computational blocks 344 is applied. Each block 344 first performs a cross attention "read" operation between latent tokens 342 and conditioning signals such as a diffusion timestep, then an additional groupwise "read" cross attention operation between latent and patch tokens of corresponding groups to compress patch information. Blocks 344 apply a series of self attention operations to the latent tokens 342, and perform a groupwise "write" cross attention operation that decompresses information in the latent tokens 342 to update the patch tokens 350. Finally, the patch tokens 350 are projected back to the pixel space to form the output 352 and generate video frames 354. Self conditioning is applied on the set of latent tokens 342 to preserve the compressed video representation computed in previous sampling steps.

This disclosure provides the architectural considerations useful in achieving these goals. Temporal modeling is a desirable aspect of a high-quality video generator. FIT block 340 produces patch tokens 350 by considering three dimensional patches of size $T_p \times H_p \times W_p$ spanning both the spatial and temporal dimensions. Values of $T_p > 1$ are found to limit temporal modeling performance, so only patches spanning the spatial dimension are considered. In addition, similar to patches, FIT block 340 groups patch tokens 350 into groups spanning both the temporal and spatial dimensions, and performs cross attention operations group by group. The temporal size of each group is configured so that each group covers all T video frames of videos 302 for best temporal modeling. Furthermore, videos 302 contain more information with respect to images due to the presence of the temporal dimension, thus the number of latent tokens 342 representing the size of the compressed space is increased in which joint spatiotemporal computation is performed. Some FITs make use of local layers which perform self attention operations on patch tokens corresponding to the same group which operation is computationally expensive for large amounts of patch tokens. FIT 320 replaces the local layers with a feed forward module after each cross attention "read" or "write" operation.

FIT 320 makes use of conditioning information represented by a sequence of conditioning tokens to control the generation process. In addition to a token σ representing the current noise, to enable text conditioning, a text encoder 360, such as a Text-to-Text Transfer Transformer (T5), extracts text embeddings from the text provided to video input 332. To support variable video framerates and large differences in resolution and aspect ratios in training data, additional tokens v and r are concatenated that represent the framerate and original resolution of the current input, respectively.

To generate high-resolution videos 354 at output 352, a model cascade is implemented consisting of a first-stage model producing 36×64px videos and a second-stage upsampling model producing 144×256px videos. To improve upsampling quality, the second-stage low-resolution inputs are corrupted with a variable level of noise during training and during inference apply a level of noise to the first-stage outputs obtained by hyperparameter search.

FIT 320 is trained, in an example, using a Layer-wise Adaptive Moments (LAMB) optimizer with a learning rate of $5e^{-3}$, a cosine learning schedule and a total batch size of 2048 videos and 2048 images, achievable due to the video generator architecture of FIT 320. The first-stage model is trained over 550 k steps and the second-stage model is finetuned on high-resolution videos starting from the first-stage model weights for 200 k iterations. The token representing $\sigma_{in}$ is posed such that $\sigma_{in}=S\sqrt{T}$. Considering videos with T=16 frames and the original 64px resolution for which EDM was designed, $\sigma_{in}=4$ for the first-stage and $\sigma_{in}=16$ for the second-stage model.

In an example, video samples are produced from gaussian noise and user-provided conditioning information using a deterministic sampler and the two-stage cascade model, such as using 256 sampling steps for the first-stage and 40 sampling steps for the second-stage model, and employing classifier free guidance to improve text-video alignment. Dynamic thresholding and oscillating guidance consistently improve sample quality.

In an example, FIT 320 can be trained on an internal dataset consisting of 1,265,000 (1.265M) images and 819, 000 (819K) hours of videos, each with a corresponding text caption. Due to the difficulty in acquiring high-quality captions for videos 354, a video captioning model is used to produce synthetic video captions for the portion of videos in the dataset missing such annotation. For example, for the purpose of model evaluation, the University of Central Florida UCF101 video dataset (available from the University of Central Florida Center for Research in Computer Vision in Orlando, Florida) and the Microsoft Research Video to Text (MSR-VTT) dataset (available from Microsoft Corp. of Redmond, Washington) may be used.

FIT 320 was evaluated by considering two U-Net variants of different capacities to two sizes of FIT 320 to evaluate the scalability of both architectures and results are shown in Table 2. A 500 million (500M) parameters FIT 320 trains 3.31× faster than the baseline 284M parameters U-Net, performs inference 4.49× faster and surpasses it in terms of Fréchet inception distance (FID) and CLIPSIM. In addition, both FITs 320 and U-Nets show strong performance gains with scaling. The largest FIT 320 scales to 3.9 billion (3.9B) parameters with only a 1.24× increase in inference time with respect to the 284M U-Net.

TABLE 2

|  | FID↓ | FVD↓ | CLIPSIM ↑ | Train Thr.↓ | Inf. Thr.↓ |
|---|---|---|---|---|---|
| U-Net 85M | 8.21 | 45.94 | 0.2319 | 133.2 | 49.6 |
| U-Net 284M | 4.90 | 23.76 | 0.2391 | 230.3 | 105.1 |
| FIT 500M | 3.07 | 27.79 | 0.2459 | 69.5 | 23.4 |
| FIT 3.9B | 2.51 | 12.31 | 0.2579 | 526.0 | 130.4 |

To evaluate the choices operated on the diffusion framework of FIT 320, different configurations of the diffusion process were ablated using the 500M FIT 320 architecture. Variations shown in Table 3 are: (i) the original EDM framework, (ii) the scaled diffusion framework of FIT 320 with EDM $\sigma_{data}$, (iii) the framework of FIT 320 with a reduced value of $\sigma_{in}$, and (iv) the framework of FIT 320 with images not treated as infinite-frame-rate videos. As shown in the last line of Table 3, the framework of FIT 320 shows improvements over EDM under all metrics (i) and shows benefits in setting $\sigma_{data}=1$, an effect attributed to the creation of a training target and loss weighting matching the widely used v-prediction formulation shown at left in Table 1. Using $\sigma_{in}<S\sqrt{T}$ impairs performance. Treating images as infinite-frame-rate videos consistently improves FID.

TABLE 3

|  | $\sigma_{data}$ | $\sigma_{in}$ | Imgs. as Videos | FID ↓ | FVD↓ | CLIPSIM↑ |
|---|---|---|---|---|---|---|
| (i) | 0.5 | 1.0 | ✓ | 6.58 | 39.95 | 0.2370 |
| (ii) | 0.5 | 4.0 | ✓ | 4.03 | 31.00 | 0.2449 |
| (iv) | 1.0 | 2.0 | ✓ | 4.45 | 34.89 | 0.2428 |
| (iii) | 1.0 | $\frac{1}{4.0}$ | X | 3.50 | 24.88 | 0.2469 |
| FIT | 1.0 | 4.0 | ✓ | 3.07 | 27.79 | 0.2459 |

A comparison of the FIT method 330 against baselines on the UCF101 and MSR-VTT datasets are shown, respectively, in Table 4 and Table 5. Fréchet inception distance (FID) and Fréchet video distance (FVD) video quality metrics show improvements over the baselines, which is attributed to the employed diffusion framework and joint spatiotemporal modeling performed by the architecture of FIT 320. On the UCF101 dataset, the FIT method 330 produces the second-best image score (IS) of 36.84, demonstrating good video-text alignment. While method 330 surpasses Make-A-Video on the UCF101 dataset, method 330 produces a lower CLIPSIM score on the MSR-VTT dataset. This is attributed to the use of the T5 encoder text embeddings in place of the commonly used CLIP embeddings which were observed to produce higher text-image alignment despite similar CLIPSIM.

TABLE 4

|  | FVD ↓ | FID ↓ | IS ↑ |
|---|---|---|---|
| CogVideo (Chinese) | 751.3 | — | — |
| MagicVideo | 655 | — | — |
| CogVideo (English) | 701.6 | — | 25.27 |
| LVDM | 641.8 | — | — |
| Video LDM | 550.6 | — | 33.45 |
| VideoFactory | 410.0 | — | — |
| Make-A-Video | 367.2 | — | 33.00 |
| PYoCo | 355.2 | — | 47.46 |
| FIT (256 × 256 px) | 242.6 | 43.6 | 36.84 |
| FIT (256 × 144 px) | 197.7 | 36.1 | 36.84 |

TABLE 5

|  | CLIP-FID ↓ | FVD ↓ | CLIPSIM ↑ |
|---|---|---|---|
| NUWA (Chinese) | 47.68 | — | 0.2439 |
| CogVideo (Chinese) | 24.78 | — | 0.2614 |
| CogVideo (English) | 23.59 | — | 0.2631 |
| MagicVideo | — | 998 | — |
| LVDM | — | — | 0.2381 |
| Latent-Shift | 15.23 | — | 0.2773 |
| Video LDM | — | — | 0.2929 |
| VideoFactory | — | — | 0.3005 |
| Make-A-Video | 13.17 | — | 0.3049 |
| PYoCo | 9.73 | — | — |
| FIT (256 × 256 px) | 8.86 | 102.6 | 0.2802 |
| FIT (256 × 144 px) | 7.99 | 101.5 | 0.2802 |

Figure 4:
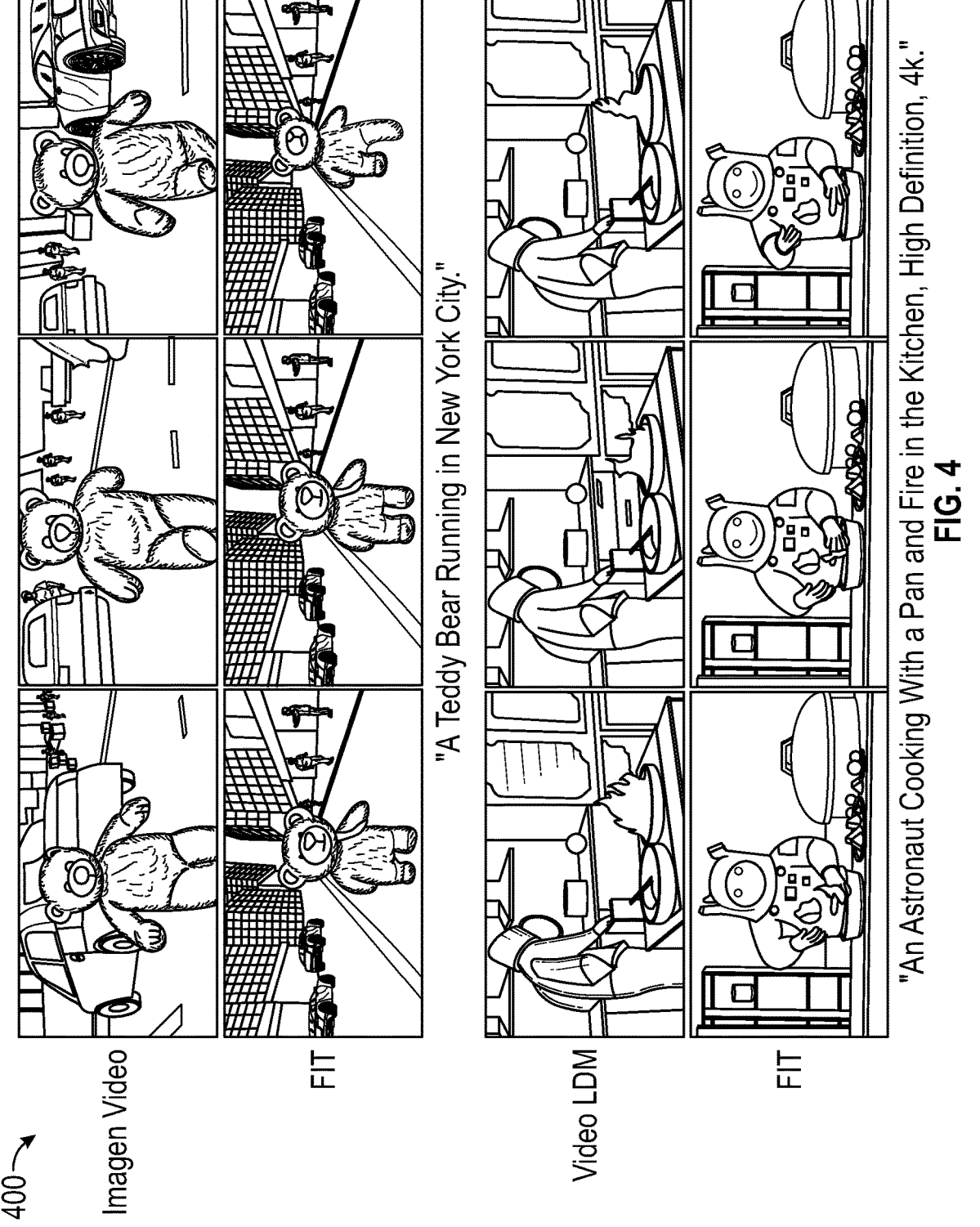
FIG. 4 are illustrations depicting results comparing the FIT model to state-of-the-art video generators on publicly available samples.
Figure 4:
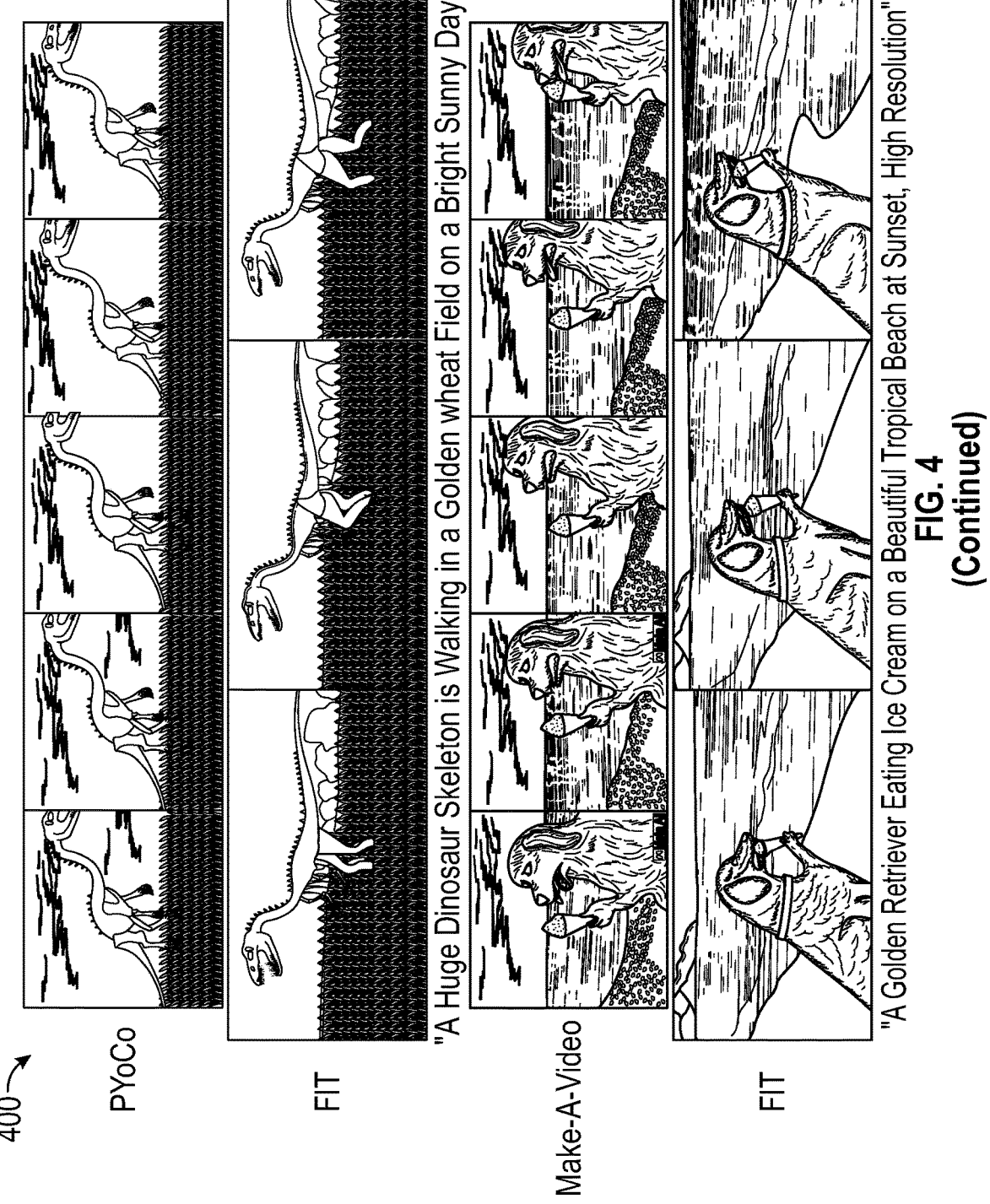

FIG. 4 shows results 400 comparing the FIT method 320 to four state-of-the-art video generators on publicly available samples. The four state-of-the-art video generators are Imagen Video (available from Google of Mountain View, California), Video LDM (available from NVIDIA Toronto AI Lab of Toronto, Ontario, Canada), PYoCo (available from NVIDIA of Santa Clara, California), and Make-A-Video (available from Meta of Menlo Park, CA). While baseline methods present motion artifacts or produce dynamic images, FIT method 320 produces more temporally coherent motion.

Figure 5:
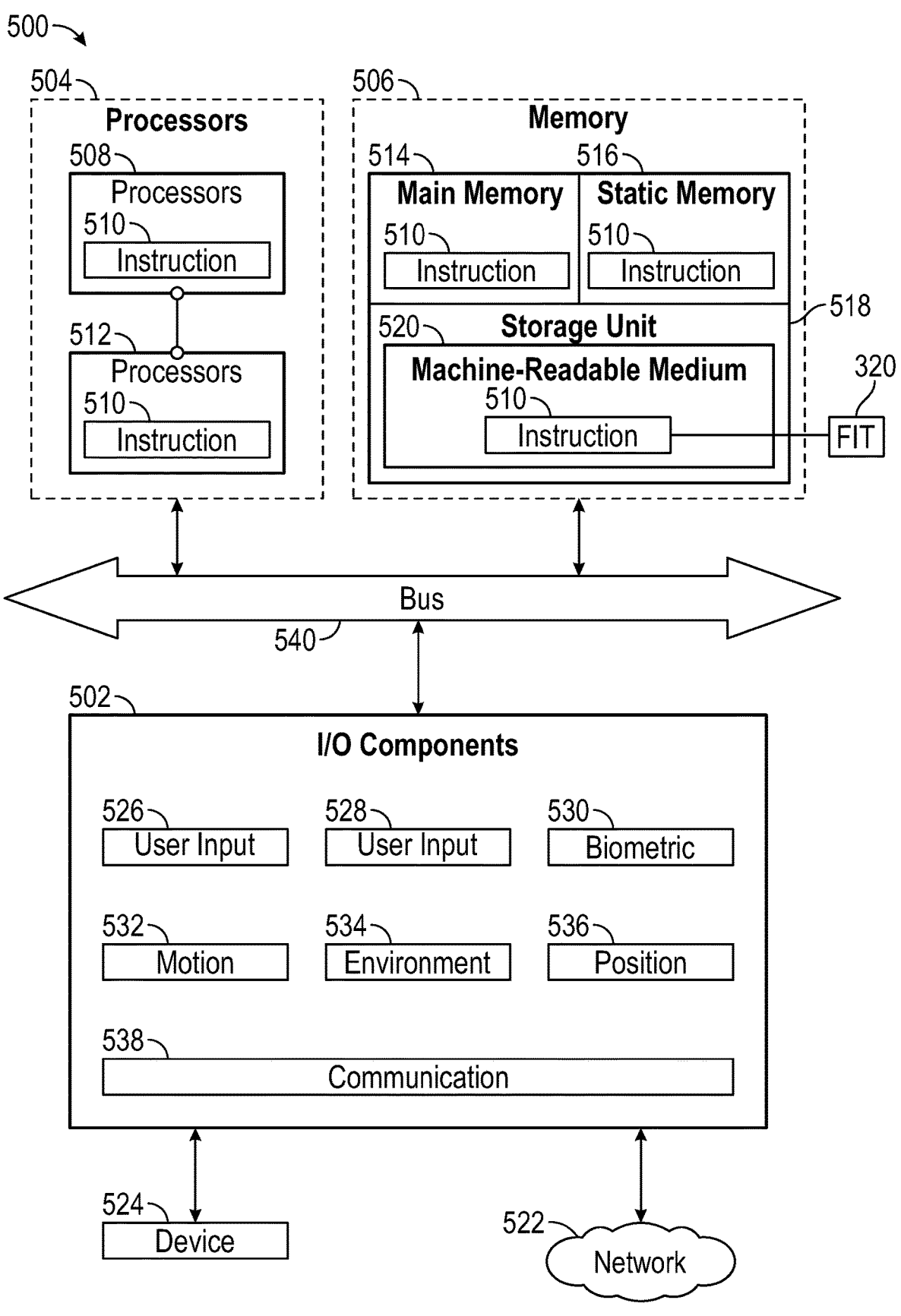
FIG. 5 is a diagrammatic representation of a machine configured to operate the FIT model.

FIG. 5 is a diagrammatic representation of the machine 500 within which instructions 510 (e.g., software, a program, an application, an applet, an app, or other executable code) for causing the machine 500 to perform any one or more of the methodologies discussed herein may be executed. For example, instructions 510 may cause the machine 500 to execute any one or more of the methods described herein for FIT 320. Instructions 510 transform the general, non-programmed machine 500 into a particular machine 500 programmed to carry out the described and illustrated functions in the manner described. The machine 500 may operate as a standalone device or may be coupled (e.g., networked) to other machines. In a networked deployment, machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines that individually or jointly execute the instructions 510 to perform any one or more of the methodologies discussed herein. In some examples, the machine 500 may also comprise both client and server systems, with certain operations of a particular method or algorithm being performed on the server-side and with certain operations of the particular method or algorithm being performed on the client-side.

The machine 500 may include processors 504, memory 506, and input/output I/O components 502, which may be configured to communicate with each other via a bus 540. In an example, the processors 504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 508 and a processor 512 that execute the instructions 510. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single core, a single processor with multiple cores (e.g., a multi-core processor), multiple processors with a single core, multiple processors with multiples cores, or any combination thereof.

Memory 506 includes a main memory 514, a static memory 516, and a storage unit 518, both accessible to the processors 504 via the bus 540. The main memory 506, the static memory 516, and storage unit 518 store the instructions 510 for any one or more of the methodologies or functions described herein. The instructions 510 may also reside, completely or partially, within the main memory 514, within the static memory 516, within machine-readable medium 520 within the storage unit 518, within at least one of the processors 504 (e.g., within the processor's cache memory), or any suitable combination thereof, during execution thereof by the machine 500.

The I/O components 502 may include a wide variety of components to receive input, provide output, produce output, transmit information, exchange information, capture measurements, and so on. The specific I/O components 502 that are included in a particular machine will depend on the type of machine. For example, portable machines such as mobile phones may include a touch input device or other such input mechanisms, while a headless server machine will likely not include such a touch input device. It will be appreciated that the I/O components 502 may include many other components that are not shown in FIG. 5. In various examples, the I/O components 502 may include user output components 526 and user input components 528. The user output components 526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 502 may include biometric components 530, motion components 532, environmental components 534, or position components 536, among a wide array of other components. For example, the biometric components 530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 532 include acceleration sensor components (e.g., accelerometer), gravitation sensor components, rotation sensor components (e.g., gyroscope).

The environmental components 534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 502 further include communication components 538 operable to couple the machine 500 to a network 522 or devices 524 via respective coupling or connections. For example, the communication components 538 may include a network interface Component or another suitable device to interface with the network 522. In further examples, the communication components 538 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 524 may be another machine or any of a wide variety of peripheral devices (e.g., a peripheral device coupled via a USB).

Moreover, the communication components 538 may detect identifiers or include components operable to detect identifiers. For example, the communication components 538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 538, such as location via Internet Protocol (IP) geolocation, location via Wi-Fi® signal triangulation, location via detecting an NFC beacon signal that may indicate a particular location, and so forth.

The various memories (e.g., main memory 514, static memory 516, and memory of the processors 504) and storage unit 518 may store one or more sets of instructions and data structures (e.g., software) embodying or used by any one or more of the methodologies or functions described herein. These instructions (e.g., the instructions 510), when executed by processors 504, cause various operations to implement the disclosed examples including FIT 320.

The instructions 510 may be transmitted or received over the network 522, using a transmission medium, via a network interface device (e.g., a network interface component included in the communication components 538) and using any one of several well-known transfer protocols (e.g., hypertext transfer protocol (HTTP)). Similarly, instructions 510 may be transmitted or received using a transmission medium via a coupling (e.g., a peer-to-peer coupling) to devices 524.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A text-to-video device, comprising:
a far-reaching interleaved transformer (FIT) block configured to learn a compressed representation of video input having text using a set of learnable latent tokens, wherein the FIT block includes a diffusion framework and joint spatiotemporal modeling using a two-stage cascaded model, the FIT block configured to:
produce a sequence of patch tokens from the text that are divided into groups;
instantiate the set of latent tokens and apply a sequence of computational blocks, wherein each of the computational blocks are configured to:
    perform a cross attention read operation between the latent tokens and conditioning signals;
    perform a groupwise read cross attention operation between the latent tokens and the patch tokens of corresponding said groups to compress patch information;
    apply a series of self attention operations to the latent tokens; and
    perform a groupwise write cross attention operation that decompresses information in the latent tokens to update the patch tokens; and
    project the patch tokens to generate video frames.

2. The text-to-video device of claim 1, wherein one stage of the two-stage cascaded model is configured to focus on motion modeling and the other stage is configured to focus on high-frequency details.

3. The text-to-video device of claim 2, wherein the diffusion framework is configured to perform a diffusion process where a process signal-to-noise ratio (SNR) is configured to be controlled through scaling of an input signal.

4. The text-to-video device of claim 2, wherein the groups of patch tokens span both temporal and spatial dimensions.

5. The text-to-video device of claim 4, wherein the computational blocks are configured to produce the patch tokens by considering three dimensional patches of size T×H×W spanning both the spatial and temporal dimensions, where T represents the temporal dimension, H represents height in the spatial dimension, and W represents width in the spatial dimension.

6. The text-to-video device of claim 1, wherein the computational blocks are configured to apply conditioning on the set of latent tokens through a cross attention read operation.

7. The text-to-video device of claim 1, wherein the FIT block further comprise a text encoder configured to perform text conditioning and extract the text from the video input.

8. The text-to-video device of claim 7, wherein the text conditioning is configured to use conditioning information represented by a sequence of conditioning tokens to control a generation process, wherein the conditioning tokens represent noise, framerate, and original resolution of the video input.

9. The text-to-video device of claim 8, wherein the conditioning tokens are configured to support variable video framerates and large differences in resolution and aspect ratios in training data.

10. The text-to-video device of claim 1, wherein the FIT block comprises a feed forward module after each cross attention read or write operation.

11. A method of using a text-to-video device comprising a far-reaching interleaved transformer (FIT) block configured to learn a compressed representation of video input having text using a set of learnable latent tokens, wherein the FIT block includes a diffusion framework and joint spatiotemporal modeling using a two-stage cascaded model, the method comprising the FIT block:
producing a sequence of patch tokens from the text that are divided into groups;
instantiating the set of latent tokens and applying a sequence of computational blocks, wherein each of the computational blocks:
    perform a cross attention read operation between the latent tokens and conditioning signals;
    perform a groupwise read cross attention operation between the latent tokens and the patch tokens of corresponding said groups to compress patch information;
    apply a series of self attention operations to the latent tokens; and
    perform a groupwise write cross attention operation that decompresses information in the latent tokens to update the patch tokens; and
    projecting the patch tokens to generate video frames.

12. The method of claim 11, wherein one stage of the two-stage cascaded model focuses on motion modeling and the other stage focuses on high-frequency details.

13. The method of claim 12, wherein the groups of patch tokens span both temporal and spatial dimensions.

14. The method of claim 13, wherein the computational blocks produce the patch tokens by considering three dimensional patches of size T×H×W spanning both the spatial and temporal dimensions, where T represents the temporal dimension, H represents height in the spatial dimension, and W represents width in the spatial dimension.

15. The method of claim 11, wherein the computational blocks apply conditioning on the set of latent tokens through a cross attention read operation.

16. The method of claim 11, wherein the FIT block further comprises a text encoder performing text conditioning and extract the text from the video input.

17. The method of claim 16, wherein the text conditioning uses conditioning information represented by a sequence of conditioning tokens to control a generation process, wherein the conditioning tokens represent noise, framerate, and original resolution of the video input.

18. The method of claim 17, wherein the conditioning tokens support variable video framerates and large differences in resolution and aspect ratios in training data.

19. The method of claim 11, wherein the FIT block comprises a feed forward module after each cross attention read or write operation.

20. A non-transitory computer readable medium storing program code, which when executed, is operative to cause a text-to-video device comprising a far-reaching interleaved transformer (FIT) block configured to learn a compressed representation of video input having text using a set of learnable latent tokens, wherein the FIT block includes a diffusion framework and joint spatiotemporal modeling using a two-stage cascaded model, to perform:

producing a sequence of patch tokens from the text that are divided into groups;

instantiating the set of latent tokens and applying a sequence of computational blocks, wherein each of the computational blocks:

perform a cross attention read operation between the latent tokens and conditioning signals;

perform a groupwise read cross attention operation between the latent tokens and the patch tokens of corresponding said groups to compress patch information;

apply a series of self attention operations to the latent tokens; and perform a groupwise write cross attention operation that decompresses information in the latent tokens to update the patch tokens; and projecting the patch tokens to generate video frames.

\* \* \* \* \*